(12) United States Patent
Stoops

(10) Patent No.: US 7,478,601 B2
(45) Date of Patent: Jan. 20, 2009

(54) ROBOTIC TURNTABLE

(76) Inventor: Dean Stoops, 2065 Georgetown Dr., Corona, CA (US) 92881

( * ) Notice: Subject to any disclaimer, the term of this patent is extended or adjusted under 35 U.S.C. 154(b) by 537 days.

(21) Appl. No.: 11/059,751

(22) Filed: Feb. 16, 2005

(65) Prior Publication Data

US 2006/0179984 A1    Aug. 17, 2006

(51) Int. Cl.
*A47F 5/12* (2006.01)
(52) U.S. Cl. ............................ 108/7; 108/20
(58) Field of Classification Search ............ 108/20, 108/21, 22, 7, 94; 74/16, 825
See application file for complete search history.

(56) References Cited

U.S. PATENT DOCUMENTS

| | | | |
|---|---|---|---|
| 4,365,561 A * | 12/1982 | Tellier et al. ............ | 108/7 |
| 4,815,391 A * | 3/1989 | Lee ...................... | 108/7 |
| 4,873,651 A | 10/1989 | Raviv | |
| 5,023,895 A | 6/1991 | McCroskey et al. | |
| 5,036,776 A * | 8/1991 | Veyhl et al. .............. | 108/7 |
| 5,054,991 A * | 10/1991 | Kato ...................... | 108/20 |
| 5,117,761 A * | 6/1992 | Kasai et al. .............. | 108/22 |
| 5,340,111 A * | 8/1994 | Froelich .................. | 108/7 |
| 5,501,119 A * | 3/1996 | Yanagisawa ............ | 108/20 |
| 6,107,615 A * | 8/2000 | Choi ...................... | 108/20 |
| 6,455,835 B1 | 9/2002 | Bernardini et al. | |

* cited by examiner

*Primary Examiner*—José V Chen
(74) *Attorney, Agent, or Firm*—Kenneth L. Green; Edgar W. Averill, Jr.

(57) ABSTRACT

A robotic turntable includes a first rotating table, a second rotating table, and a workpiece table. A motor rotates the first rotating table. The second rotating table is coaxial with the first rotating table and rotationally positionable relative to the first rotating table. The workpiece table is rotationally fixed with respect to the second rotating table and is tiltably positionable with respect to the second rotating table. A first actuator cooperates with the second table to change the rotational position of the second table with respect to the first table. A second actuator cooperates with a lever attached to the first table to change the tilt of the workpiece table. Changes to rotation and tilt are obtained solely by the positions of the actuators and rotation of the first table by the motor.

20 Claims, 15 Drawing Sheets

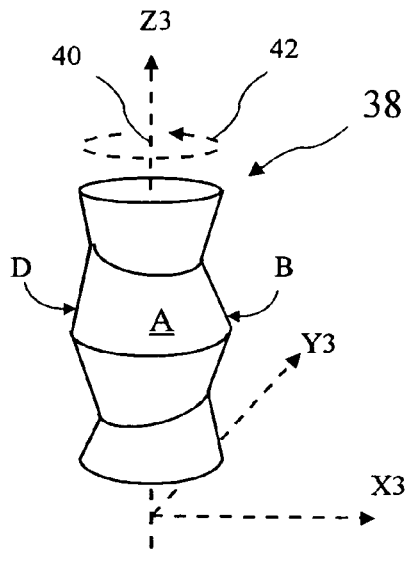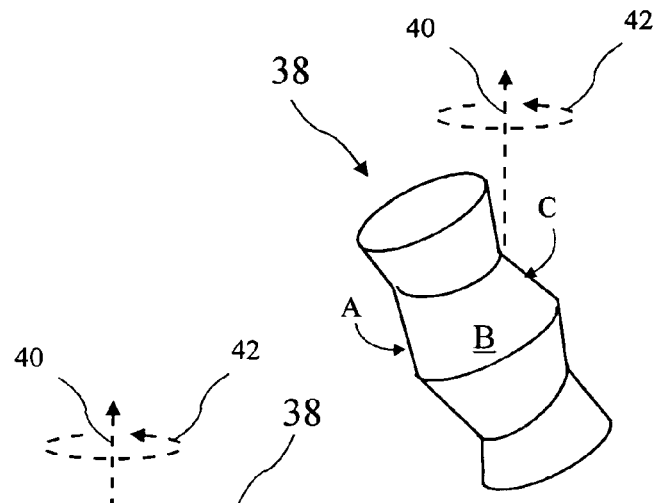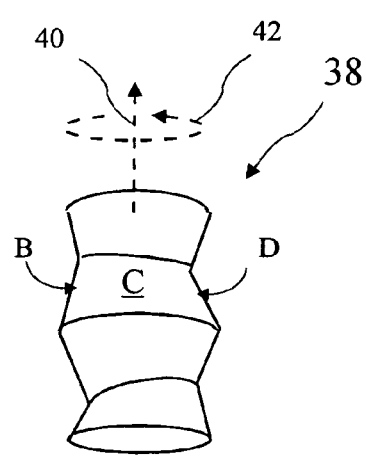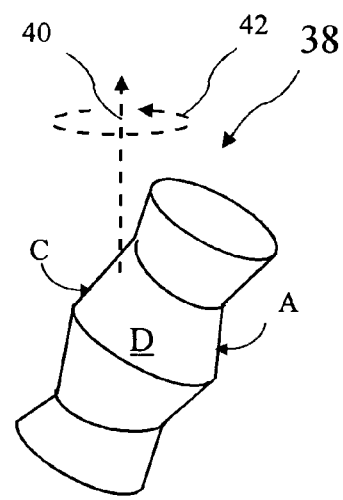
FIG. 2
FIG. 2B
FIG. 2A
FIG. 2C
FIG. 2D

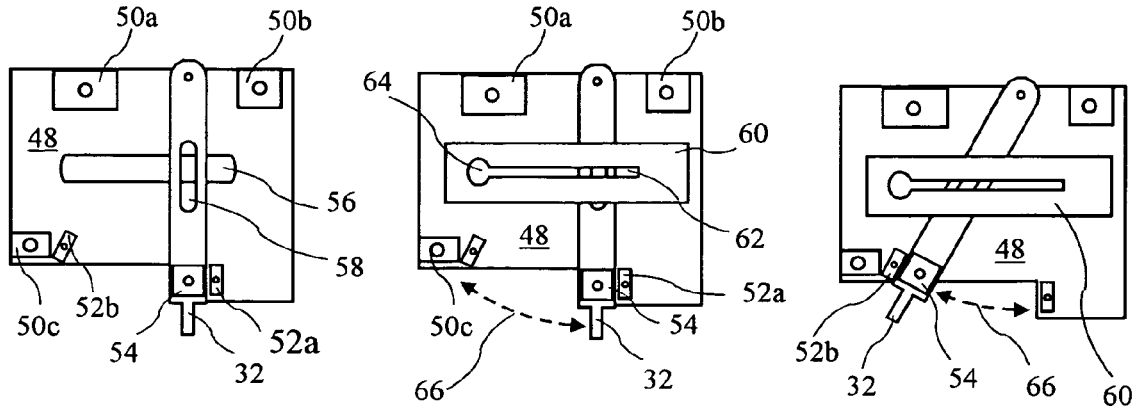
FIG. 11   FIG. 12A   FIG. 12B
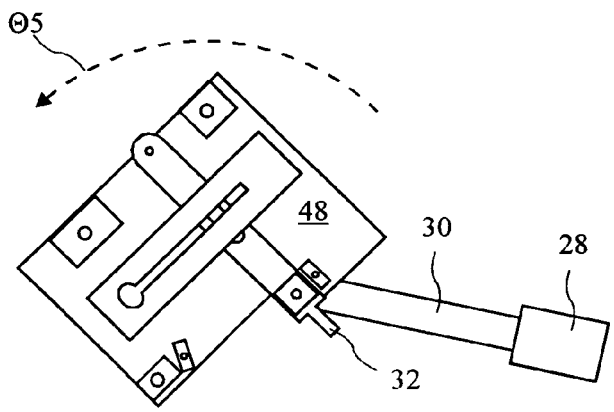
FIG. 13A
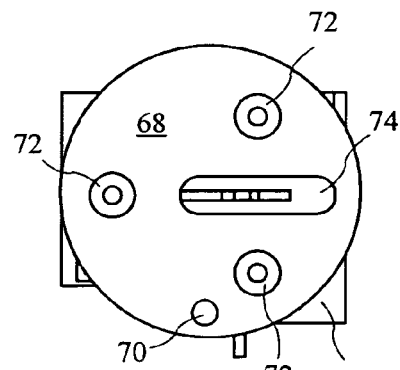
FIG. 14
FIG. 13B

ROBOTIC TURNTABLE

BACKGROUND OF THE INVENTION

The present invention relates to turntables and in particular to a robotic turntable for presenting various aspects of an object for scanning.

Various small objects are used as models for molding shaped articles. For example, ear canal moldings are made to manufacture in-the-ear hearing aids, and tooth molds are made for manufacturing crowns. Modern equipment enables scanning of moldings to generate numerical models of the shapes of moldings, and the numerical models may be used to control equipment which manufactures the final product. Known equipment for scanning moldings is expensive, and the costs are prohibitive for placement of scanning machines at dental or medical offices. As a result, moldings are mailed, resulting in mailing costs and delays in providing a product.

BRIEF SUMMARY OF THE INVENTION

The present invention addresses the above and other needs by providing a novel robotic turntable suitable for use in individual medical and dental offices. The robotic turntable includes a first rotating table, a second rotating table, and a workpiece table. A motor rotates the first rotating table. The second rotating table is coaxial with the first rotating table and rotationally positionable relative to the first rotating table. The workpiece table is rotationally fixed with respect to the second rotating table and is tiltably positionable with respect to the second rotating table. A first actuator cooperates with the second table to change the rotational position of the second table with respect to the first table. A second actuator cooperates with a lever attached to the first table to change the tilt of the workpiece table. Changes to rotation and tilt are obtained solely by the positions of the actuators and rotation of the first table by the motor.

In accordance with one aspect of the invention, there is provided a robotic turntable comprising a motor, a first table rotationally driven by the motor, and a workpiece table rotationally coupled to the first table and tiltable with respect to the first table. A first actuator has a free position and a stop position. In the free position, the workpiece table rotates with the first table, and in the stop position, a rotation of the first table is coupled to a change in the rotational position of the workpiece table with respect to the first table. A second actuator has a second free position and a second stop position. In the second stop position, the rotation of the first table is coupled to a change in tilt of the workpiece table.

In accordance with another aspect of the invention, there is provided a method for controlling a workpiece table. The method includes aligning a workpiece table supporting a workpiece with a first table and rotating the first table to scan a workpiece. After scanning the vertically aligned workpiece, the rotation of the first table is stopped and a second actuator arm is aligned with a spindle lever. The first table is rotated to pivot the spindle lever, thereby causing a spindle attached to the workpiece table to tilt and thereby the workpiece table to tilt. After moving the second actuator arm out of alignment with the spindle lever, the first table is again rotated thereby rotating the tilted workpiece table to obtain a scan of the tilted workpiece. The method may further include stopping the rotation of the first table and aligning a first actuator arm with an actuator notch. The first table is then rotated to create a new rotational relationship between the first table and the tilted workpiece table, wherein a new face of the workpiece is caused to tilt downward. The first actuator arm is moved out of alignment with the actuator notch and the first table again rotated thereby rotating the tilted workpiece table with a different view of the workpiece.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 depicts a workpiece suitable for use with the present invention.

FIG. 2A depicts the workpiece tilted with a face "A" tilted down.

FIG. 2B depicts the workpiece tilted with a face "A" tilted down and rotated 90 degrees clockwise from FIG. 2A.

FIG. 2C depicts the workpiece tilted with a face "A" tilted down and rotated 180 degrees clockwise from FIG. 2A.

FIG. 2D depicts the workpiece tilted with a face "A" tilted down and rotated 270 degrees clockwise from FIG. 2A.

FIG. 11 is a base plate of the first table with a spindle lever pivotally attached and with the spindle lever in a first position.

FIG. 12A is the base plate of the first table with a spindle guide over the spindle lever.

FIG. 12B is the base plate of the first table with the spindle guide over the spindle lever and with the spindle lever in a second position.

FIG. 13A shows the base plate rotated and a second actuator with a second actuator arm positioned to cooperate with the spindle lever.

FIG. 13B shows the base plate with the spindle lever pushed to the second position by the rotation of the base plate.

FIG. 14 shows an upper plate attached to the base plate.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
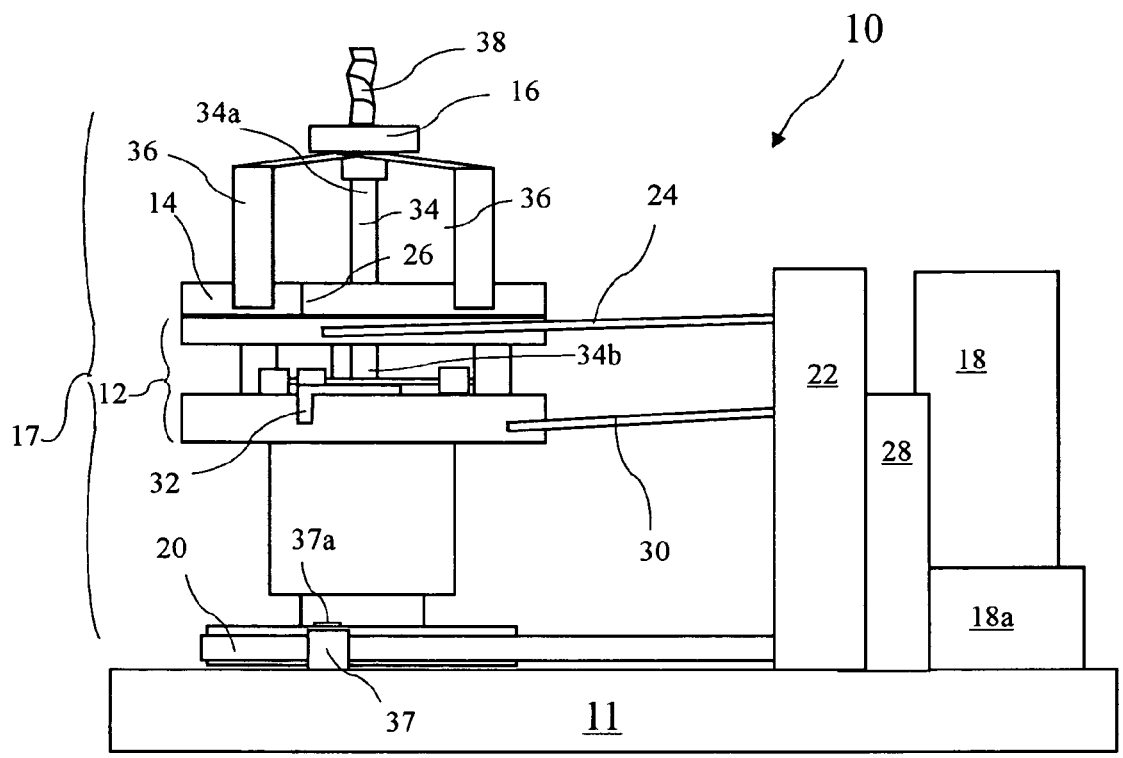
FIG. 1A is a side view of a robotic turntable according to the present invention.
Figure 1B:
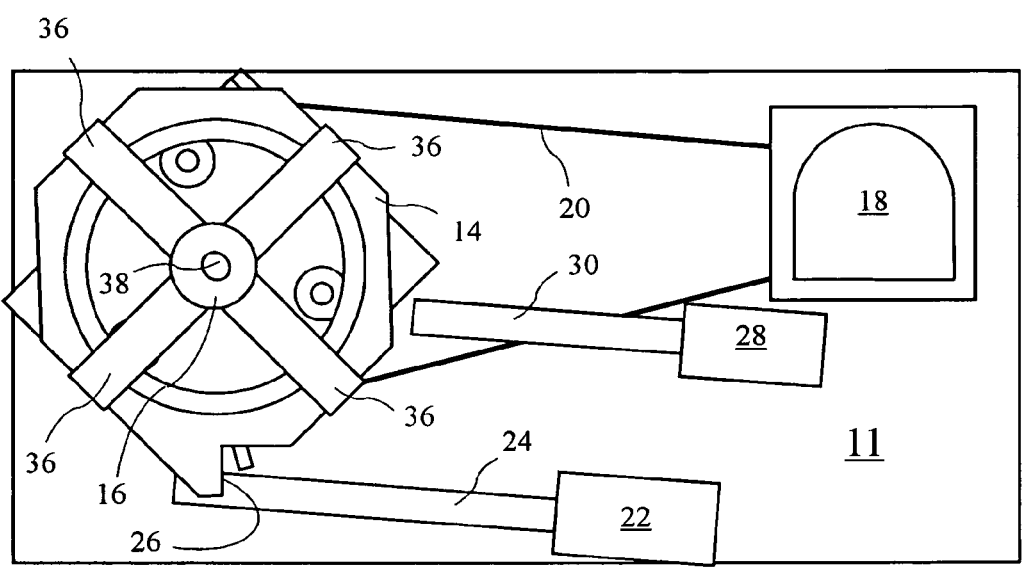
FIG. 1B is a top view of the robotic turntable according to the present invention.

A side view of a robotic turntable 10 according to the present invention is shown in FIG. 1A, and a top view of the robotic turntable 10 is shown in FIG. 1B. The turntable 10 includes a base 11 with a motor 18, actuators 22 and 28, and a rotating table assembly 17. The motor 18 is preferably controllable in a way that permits programmable and precise motion, and is controllable in speed, direction of rotation, and shaft angular position, and is more preferably a stepping motor, an AC servo motor, or a DC servo motor, and is most preferably a DC Servo motor with an incremental encoder attached to the motor back shaft. Alternatively, with proper feedback, an air motor, hydraulic motor and the like may be used.

The motor 18 is supported by a motor support 18a. A belt 20 connects the motor 18 to the rotating table assembly 17. The belt 20 may be a timing belt, gear drive, chain drive or similar reliable method of transmitting the exact motion of the motor shaft to the rotating table assembly 17, and is preferably a toothed belt to help maintain the timing between the motor 18 and the rotating table assembly 17.

The actuators 22, 24 may be solenoid actuators, air driven actuators, or hydraulic actuators, and are preferable solenoid actuators, and more preferably 12 volt solenoid actuators. The first actuator 22 includes a first actuator arm 24, and the second actuator 28 includes a second actuator arm 30. The motor 18, the first actuator 22, and the second actuator 28 are preferably jointly computer controlled to coordinate the rotation of the rotating table assembly 17 with the actuation of the first actuator 22 and the second actuator 28 to obtain the desired behavior as described below. A home position detector comprising elements 37 and 37a initialized the position of the turn table assembly at start-up. The home position detector is preferably a hall effect device, an optical switch, or micro switch, and is more preferably a hall effects sensor 37 and magnet 37a which allow an initial motor/table timing to be established.

The rotating table assembly 17 includes a first table 12, a second table 14, and a workpiece table 16. A spindle 34 is rotationally fixed to the workpiece table 16 and is supported at a table end 34a by spindle supports 36. As described below in FIG. 15A, the spindle supports 36 are preferably flat springs 76. However, the spindle supports 36 may be any support structure which constrains the workpiece table 16 to rotate with the second table 14, but allows the workpiece table 16 to tilt with respect to the second table 14. For example, the spindle supports 36 may be a solid structure with a keyed ball and socket to allow the spindle to tilt but not freely rotate. A rotating table assembly with any spindle support which rotationally fixes the spindle while allowing the spindle to tilt is intended to come within the scope of the present invention.

The second table 14 includes an actuator notch 26 for cooperation with the first actuator arm 24, and the first table 12 includes a spindle lever 32 for cooperation with the second actuator arm 30. The actuators 22 and 28 raise the respective arms 24 and 30 to obtain the cooperation of the arms 24 and 30 with the notch 26 and lever 32.

Figure 1C:
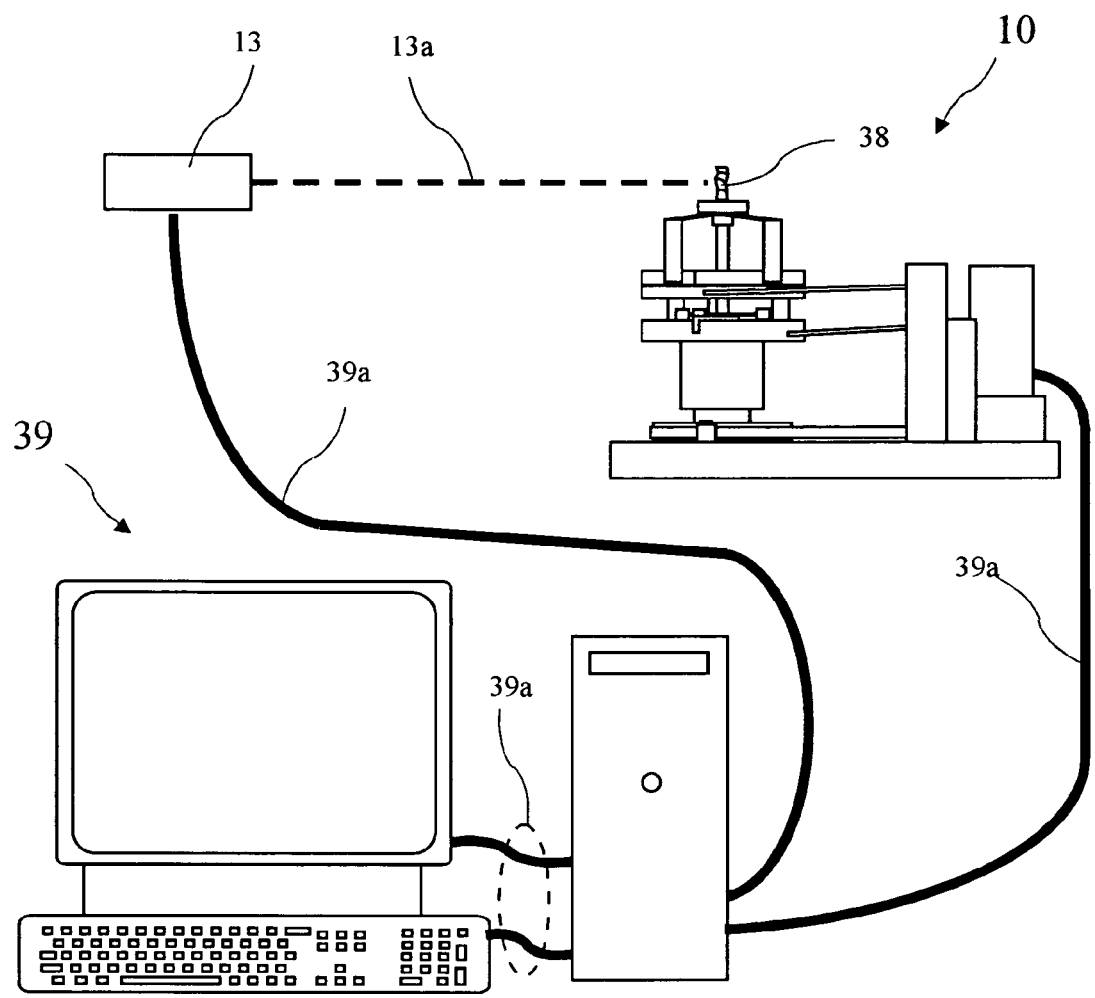
FIG. 1C is a system including a sensor and a Personal Computer (PC) cooperating with the robotic turntable.
Figure 3A:
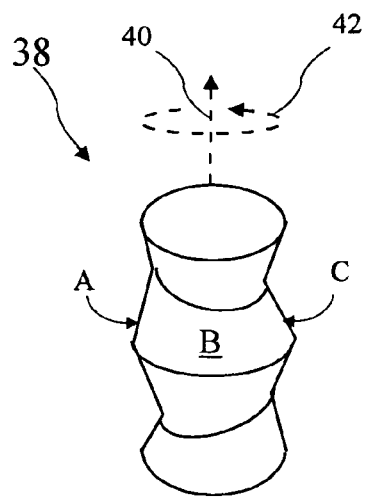
FIG. 3A shows the workpiece tilted with a face "B" tilted down.
Figure 3B:
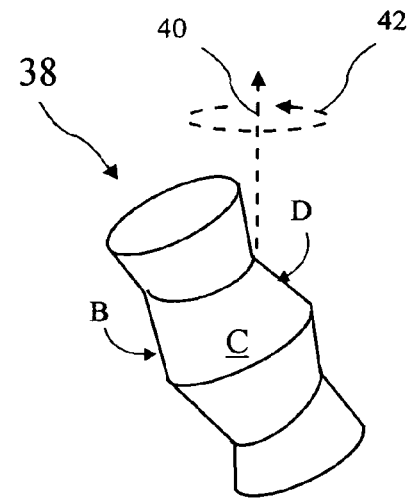
FIG. 3B depicts the workpiece tilted with a face "B" tilted down and rotated 90 degrees clockwise from FIG. 3A.
Figure 3C:
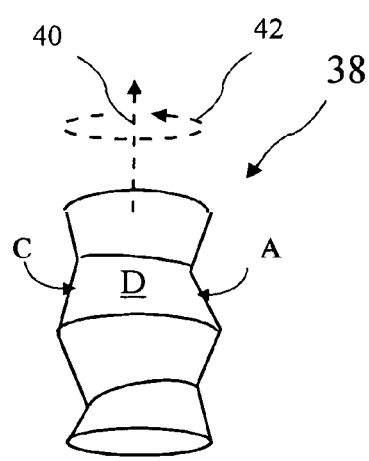
FIG. 3C depicts the workpiece tilted with a face "B" tilted down and rotated 180 degrees clockwise from FIG. 3A.
Figure 3D:
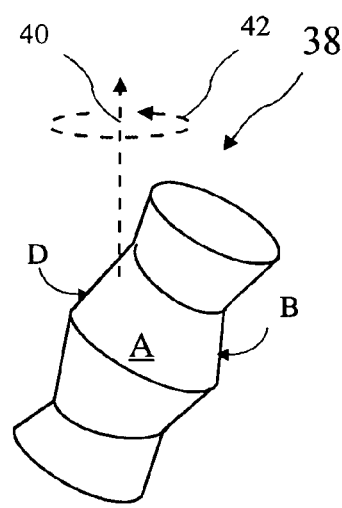
FIG. 3D depicts the workpiece tilted with a face "B" tilted down and rotated 270 degrees clockwise from FIG. 3A.

The robotic turntable 10 may be programably controlled using a robotic controller comprising an electrical (e.g., a computer), or a mechanical controller (e.g., using cams, levers, hydraulics and/or pneumatics,) is preferably controlled using a computer, and is more preferably controlled using a Personal Computer (PC). A sensor 13 and a PC 39 are shown in FIG. 1C cooperating with the robotic turntable 10. The sensor 13 directs a sensor beam 13a onto the workpiece 38 to generate a digital representation of the workpiece 38. The PC 39 is connected by cables 39a to the sensor 13 and the robotic turntable 10. The sensor 13 may be, for example, a laser sensor.

The PC 39 includes a micro-processor, memory, other elements of known personal computers, and a controller (although the controller may also reside outside the PC 39). The PC 39 programs the controller to control the robotic turntable 10. A controller program may be stored in the PC 39 and loaded into the controller as needed or the controller program may be stored in RAM on the controller card. The motor 18 provides encoder signals to the controller, and the controller includes interfaces for the encoder signals that detect signal errors. For example, the interface may look for a missing signal. Encoder signals generally comprise pairs of up and down pulses. If one pulse is missing, the interface sets an alarm. If a duty cycle of the pulses falls outside an expected range, an alarm may also be set. The controller further includes a set of software counters which increment or decrement according to the incoming encoder signals. Regardless of whether or not power is being provided to the motor 18, the counters continue to maintain a total representing the position of a motor shaft of the motor 18, thereby avoiding errors in motor shaft position due to outside influences that might force the motor shaft out of an intended position. A power supply in the PC 39 provides power to drive the motor 18 in both directions with a signal voltage output from 0 volts to approximately +−10 Volts. This power signal is passed to an amplifier to provide motor power in proportion to the signal voltage.

The robotic controller receives instructions from a computer program to rotate the motor shaft in the form of total encoder counts to define the size of the rotation and encoder counts per second to define angular velocity. Angular acceleration and angular deceleration are similarly defined. When the robotic controller executes a rotation, it first calculates a trajectory based on the angular speed and duration of the move. Then it begins to apply a power level to the motor 18 which rotates the motor shaft in the desired direction. The angular position of the motor shaft is monitored by observing the encoder counts several thousand times a second. The angular position of the motor shaft is compared with the theoretical trajectory and the error is converted to a power change to the motor 18, in the direction that will correct the error.

The robotic controller has the ability to turn off or on a number of signal outputs at points in time or according to pre-defined conditions, thereby controlling the actuators 22, 28. A complicated string of instructions to rotate the motor shaft, stop the motor shaft, operate an actuator 22 or 28 and rotate the motor shaft again are assembled to achieve the desired motions of the workpiece 38.

A workpiece 38 suitable for use with the robotic turntable 10 is shown residing vertically in FIG. 2. The workpiece 38 includes faces A, B, C (on a back side), and D. The workpiece 38 may be fixed to the workpiece table 16 and is aligned with a third coordinate system (X3, Y3, Z3) of the workpiece table 16. The coordinate systems are described in detail in FIGS. 4-10. The present invention allows the workpiece 38 to be rotated for scanning or for any other process benefitting from the positioning provided by the present invention. The workpiece 38 may be rotated while in the vertical position about the axis of rotation 40 as indicated by vertical workpiece rotation 42. The axis of rotation 40 does not tilt with respect to the second table 14.

In many instances, a simple single axis rotation as depicted in FIG. 2 is not adequate to provide sufficient views of the workpiece 38. This inadequacy may be addressed by tilting and rotating the workpiece 38 as depicted in FIGS. 2A, 2B, 2C, and 2D. The workpiece 38 is shown tilted with a face "A" tilted down in FIG. 2A. The workpiece 38 is rotated about the axis of rotation 40 and in each position shown in FIGS. 2A-2D, the face A remains down.

The workpiece 38 is depicted in FIGS. 3A, 3B, 3C, and 3D tilted and rotated with the face "B" tilted down. The workpiece 38 may further be tilted with faces C and/or D down, and rotated about the axis of rotation 40. Note that the axis of rotation 40 remains fixed, regardless of the tilt of the workpiece 38.

Figure 4:
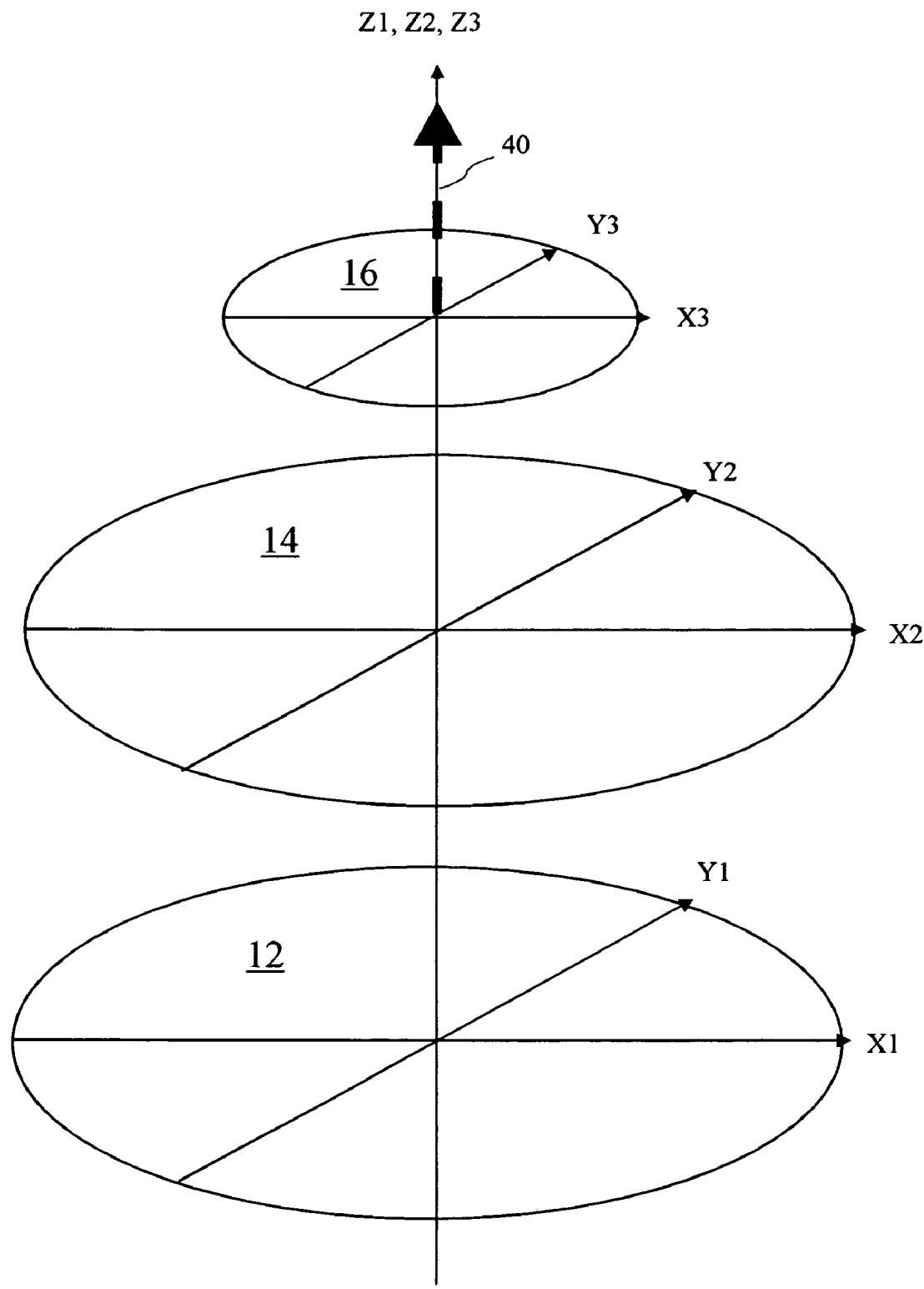
FIG. 4 shows the geometric alignment of a first table, second table, and workpiece table before rotations or tilts.

The alignment of the first table 12, the second table 14, and the workpiece table 16 before any rotations or tilts is shown in FIG. 4. The first table 12 is geometrically described by coordinate system X1, Y1, Z1. The second table 14 is geometrically described by the coordinate system X2, Y2, and Z2. The workpiece table 16 is geometrically described by the coordinate system X3, Y3, and Z3. The axis of rotation 40 is aligned with the Z1 axis.

Figure 5:
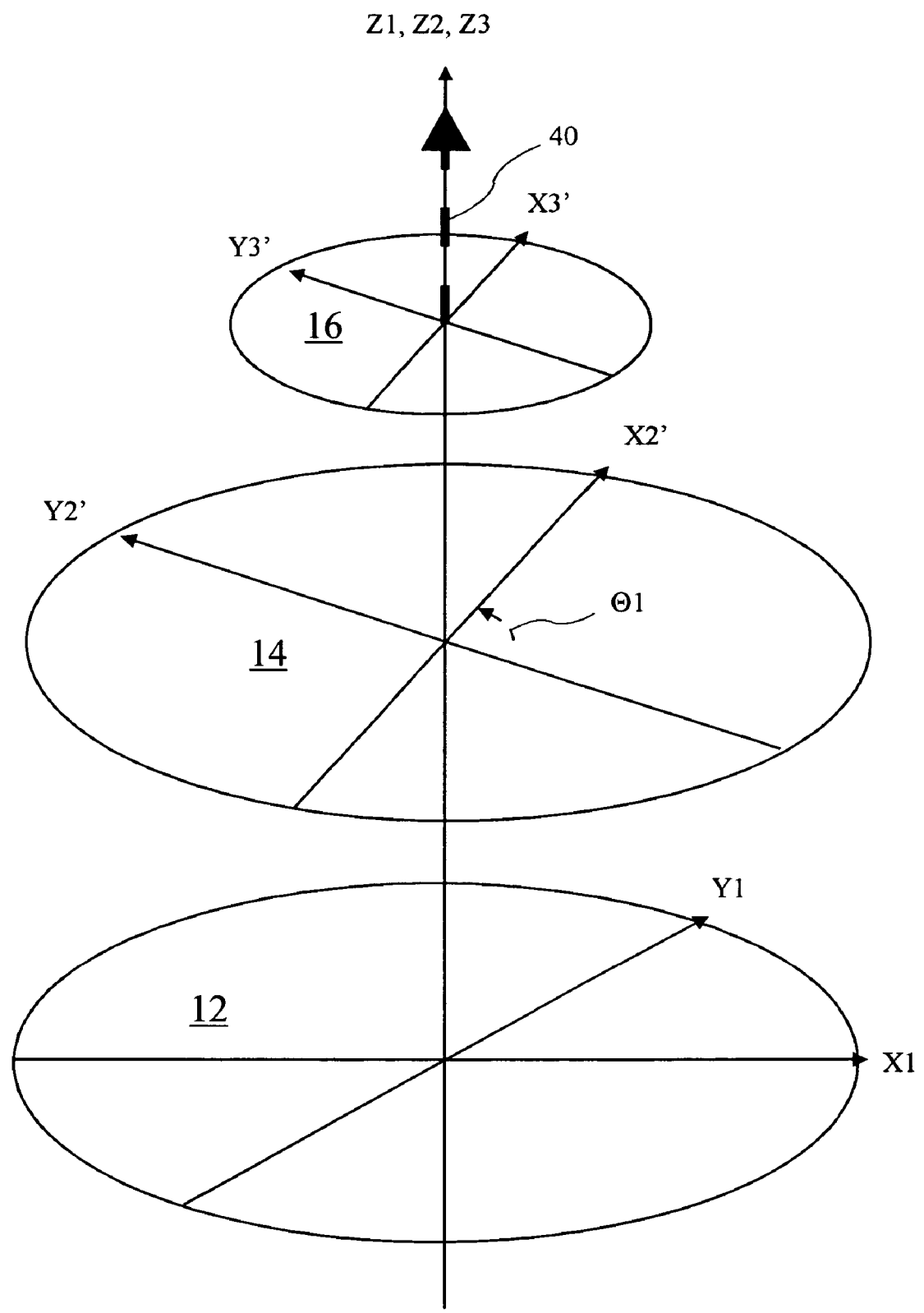
FIG. 5 shows the geometric alignment of the first table, the second table, and the workpiece table after rotating the second table with respect to the first table.

The alignment of the first table 12, the second table 14, and the workpiece table 16, after rotating the second table 14 with respect to the first table 12 by an angle Θ1, is shown in FIG. 5. The second table 14 is geometrically described by the axes X2', Y2' and Z2, and the workpiece table 16 is geometrically described by the axes X3', Y3', and Z3. The workpiece table 16 is constrained to rotate with the second table 14. The Z1, Z2, and Z3 axes remain unchanged and aligned.

Figure 6:
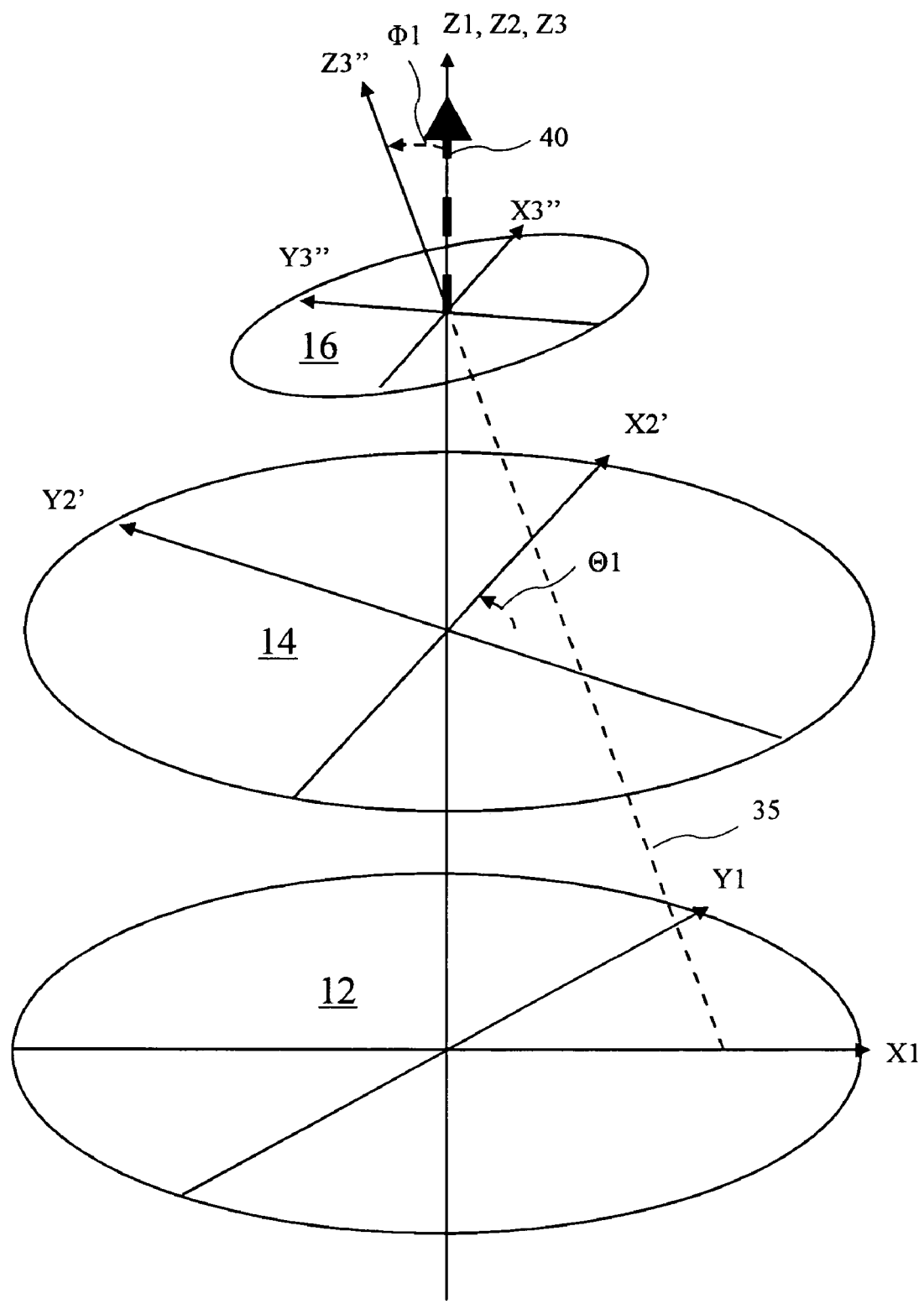
FIG. 6 shows the geometric alignment of the first table, the second table, and the workpiece table after rotating the second table with respect to the first table and tilting the workpiece table with respect to the first table and the second table.

The alignment of the first table 12, the second table 14, and the workpiece table 16 after rotating the second table 14 by the angle Θ1 with respect to the first table 12 (as seen in FIG. 5), and after tilting the workpiece table 16 by an angle φ1 with respect to the first table 12 and the second table 14, is shown in FIG. 6. The axis of rotation 40 remains fixed and aligned with the original Z1 axis. The tilted workpiece table 16 (and therefore the tilted workpiece 38) axis Z3" is aligned to a spindle axis 35 which intersects the X1 axis of the first table 12. The spindle axis 35 intersects the first table 12 along the X1 axis regardless of the rotation of the second table 14, or of the tilt of the workpiece table 16.

Figure 7:
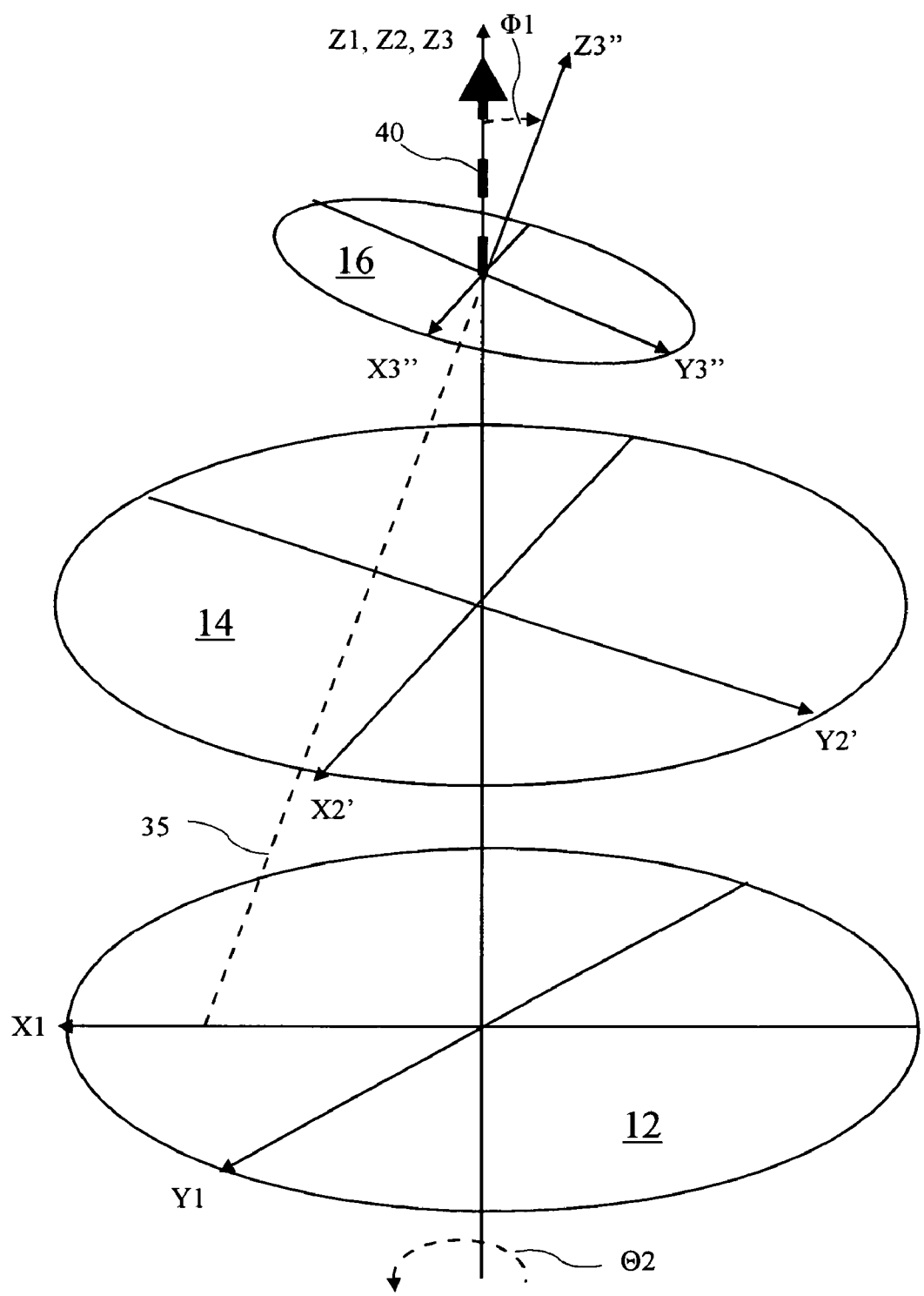
FIG. 7 shows the geometric alignment of the first table, the second table, and the workpiece table after rotating the second table with respect to the first table and tilting the workpiece table with respect to the first table and the second table and rotating the first table.

The geometries depicted in FIG. 6 are shown after an additional rotation of Θ2 of the first table 12 in FIG. 7. The relative rotation of the second table 14 with respect to the first table 12 is unchanged, and the tilt of the workpiece table 16 with respect to the second table 14 is unchanged. For example, the change from FIG. 6 to FIG. 7 is representative of the basic rotation of the rotating table assembly 17 while the workpiece 38 is being scanned. The same face of the workpiece 38 (i.e., the face aligned with the Y3" axis) is leaning downward in both FIGS. 6 and 7. The rotation Θ2 is representative of rotations occurring during scanning a workpiece.

Figure 8:
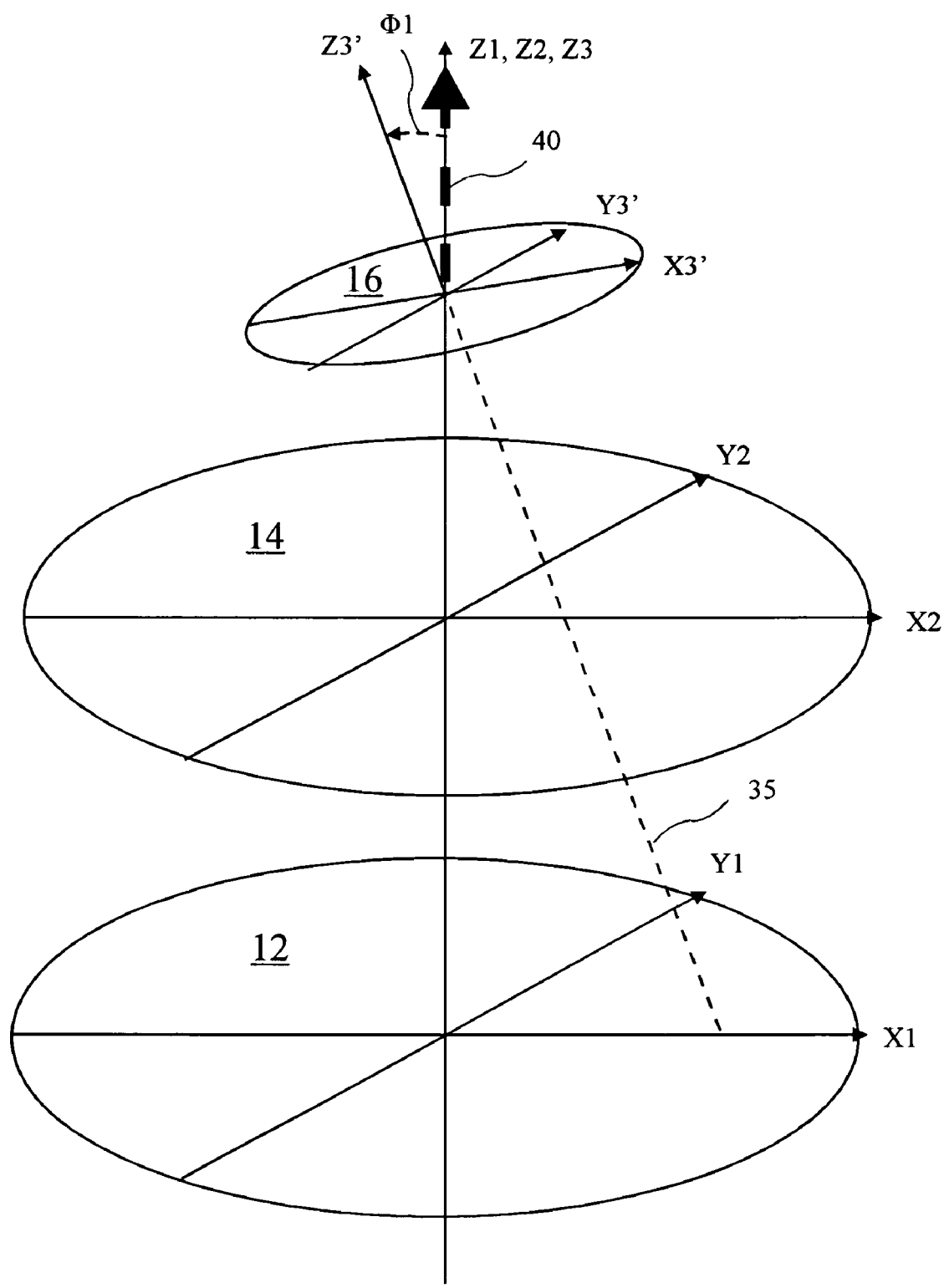
FIG. 8 shows the geometric alignment of the first table, the second table, and the workpiece table after tilting the workpiece table with respect to the first table and the second table without any rotations.

The alignment of the first table 12, the second table 14, and the workpiece table 16 after tilting the workpiece table 16 by φ1 with respect to the first table 12 and the second table 16 without any rotations, is shown in FIG. 8. It is thus shown that the operation of tilting the workpiece table 16 is independent of the rotation of the rotating table assembly 17, and of the rotation of the second table 14 with respect to the first table 12. Note however, the face of the workpiece 38 being tilted downward does depend on the rotation of the second table 14 with respect to the first table 12. In FIG. 8, the face opposite the X3' axis is tilted downward. In FIG. 6 (after rotation of the second table with respect to the first table) the face aligned with the Y3" axis is tilted downward.

Figure 9:
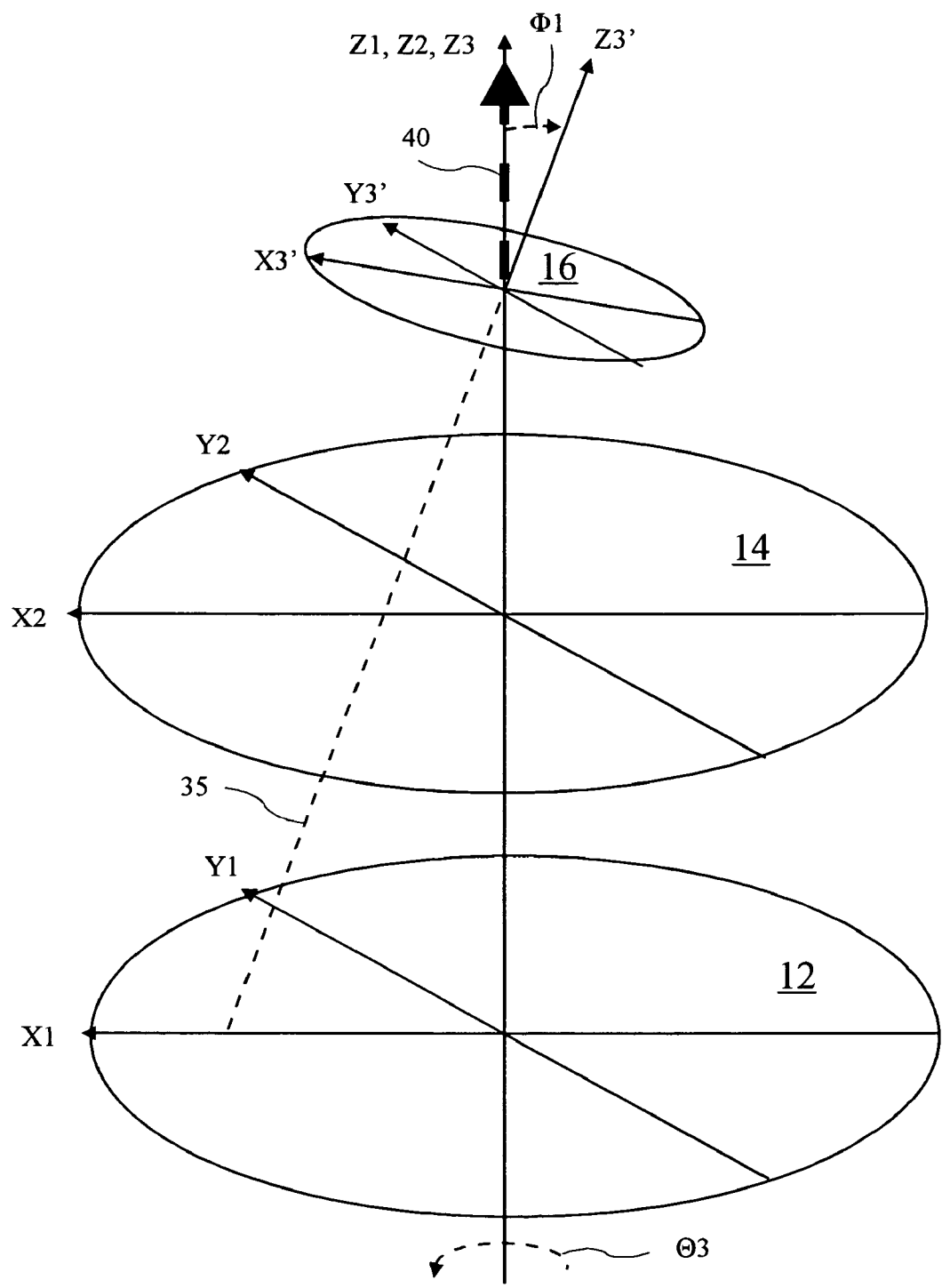
FIG. 9 shows the geometric alignment of the first table, the second table, and the workpiece table after tilting the workpiece table with respect to the first table and the second table and rotating the first table.

The alignment of the first table 12, the second table 14, and the tilted workpiece table 16 of FIG. 8 after rotating the rotating table assembly 17 by Θ3 is shown in FIG. 9. The face of the workpiece 38 approximately aligned opposite to the X3' axis is tilting down, as in FIG. 8.

Figure 10:
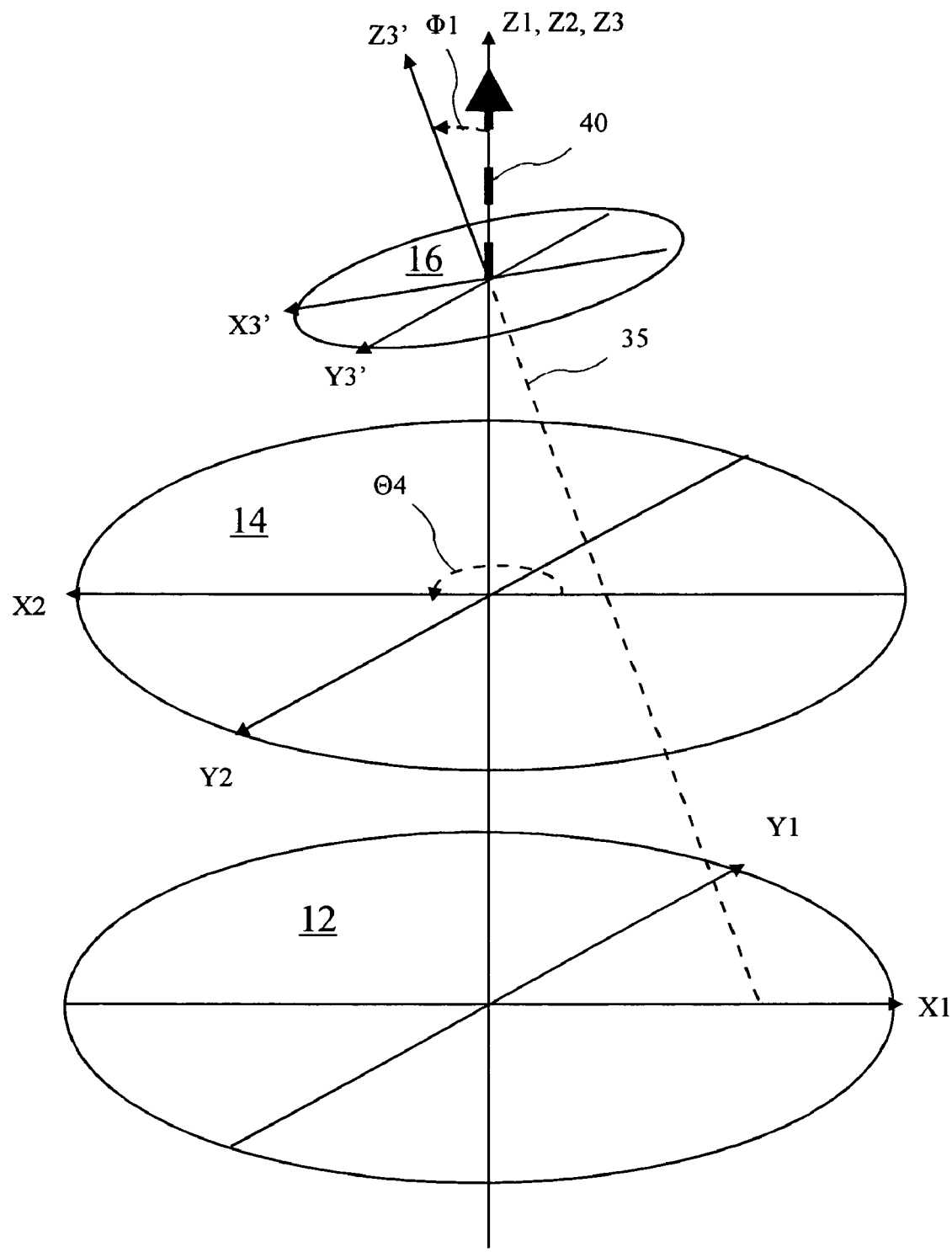
FIG. 10 shows the geometric alignment of the first table, the second table, and the workpiece table after tilting the workpiece table with respect to the first table and the second table and rotating the first table and then rotating the second table with respect to the first table.

The alignment of the first table 12, the second table 14, and the tilted workpiece table 16 of FIG. 9, after rotating the second workpiece table 14 by Θ4 with respect to the first table 12, is shown in FIG. 10. The rotation of the second table 14 relative to the first table 12, with no change in the tilt of the workpiece table 16, results in a change in the downward facing face of the workpiece 38. The face approximately aligned with axis x3' is now the downward tilting face.

A base plate 48 of the first table 12 with the spindle lever 32 pivotally attached is shown in FIG. 11. Three blocks 50a, 50b, and 50c reside on the base plate 48 and provide support and mounting for an upper plate 68 (see FIG. 14). A spindle bed 56 is formed in the based plate 48 to accommodate a lever (or moving) end 34b of the spindle 34 (see FIG. 1A). The spindle lever 32 includes a first spindle slot 58 for cooperating with the lever end 34b of the spindle 34. A magnet 54 is carried by the lever 32, and cooperates with stops 52a and 52b to provide a first position (at stop 52a) and a second position (at stop 52b).

The base plate 48 of the first table 12 with a spindle guide 60 residing over the spindle lever 32 and with the spindle lever 32 in the first position is shown in FIG. 12A. The spindle guide 60 includes a second spindle slot 62, and an assembly feature 64. The second spindle slot 62 is skewed (i.e., is not aligned) with respect to the first spindle slot 58, wherein the intersection of the spindle slots 58 and 62 create a unique position for the lever end 34b of the spindle 34. The base plate 48 with the spindle lever 32 in the second position is shown in FIG. 12B. The first position of the spindle lever 32 results in the spindle axis 34 residing in a tilted position as shown in FIG. 8, and the second position of the spindle lever 32 results in the spindle axis 34 residing in a vertical position as shown in FIG. 4. The second spindle groove 62 thus corresponds to the X1 axis in FIGS. 4-10.

The spindle lever 32 cooperates with the second actuator arm 30 to move the spindle lever 32 between the first position and the second position. The first table 12 may be rotated in the direction Θ5 while the second actuator arm 30 is aligned with the spindle lever 32 to block the rotation of the spindle lever 32. Thus blocked from rotating, the spindle lever 32 moves from the first position to the second position (relative to the base plate 48) as shown in FIG. 13B. The motor 18 (see FIGS. 1A and 1B) is controlled to rotate the rotating table assembly 17 to position the magnet 54 sufficiently close to the stop 52b, wherein magnetic attraction between the magnet 54 and the stop 52b pulls the spindle lever 32 into the second position. The spindle 34 is vertical when the spindle lever 32 is in the second position.

The spindle lever 32 may be moved from the second position to the first position by the reverse of the actions described in FIGS. 13A and 13B, wherein the actuator arm 30 is positioned to intercept the spindle lever 32 on the side opposite that depicted in FIGS. 13A and 13B, and the motor 18 rotates the base plate 48 opposite the direction Θ6 to move the spindle lever from the second position to the first position. The spindle 34 is tilted when the spindle lever 32 is in the first position.

An upper plate 68 is shown attached to the base plate 48 in FIG. 14. The upper plate 68 resides on the blocks 50a, 50b, and 50c (see FIG. 11), and includes rollers 72, spindle passage 74, and detent 70. The rollers 72 cooperate with the second table 14 to provide rotation to the second table 14 with respect to the first table 12. There are preferably three rollers 72. The spindle passage 74 allows the spindle 34 to pass through the upper plate 68 and to move between the vertical and the tilted position. The detent 70 is preferably a spring loaded ball protruding from the upper plate 68, which detent 70 cooperates with the second table 14 to provide angular indexing for the second table 14 with respect to the first table 12. The detent 70 is preferably biased upward by a leaf spring attached to a bottom surface of the upper plate 68.

Figure 15:
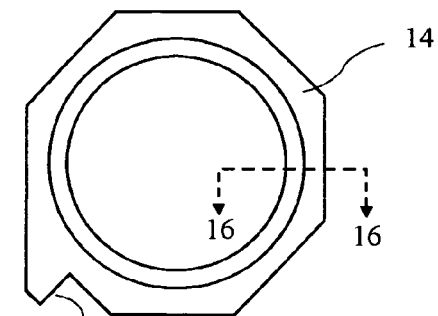
FIG. 15 is a second table according to the present invention.

The second table 14 is shown separate from the rotating table assembly 17 in FIG. 15. The perimeter of the second turntable 14 includes the actuator notch 26 for cooperation with the first actuator 22 (see FIGS. 1A and 1B). The interior of the second turntable 14 is circular.

Figure 16:
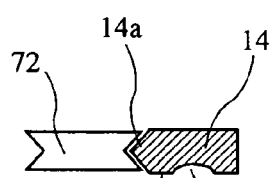
FIG. 16 is a cross-sectional view of the second table taken along line 16-16 of FIG. 15.
Figure 17B:
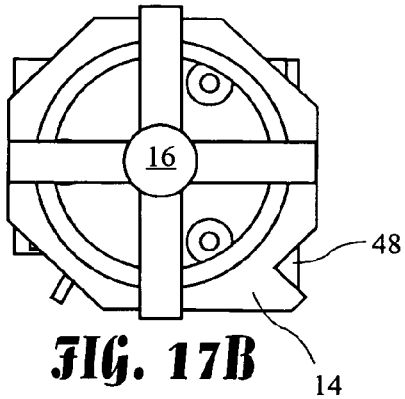
FIG. 17B shows the workpiece table attached to the second table which is attached to the first table with the second table and work piece rotated 90 degrees counter clockwise.
Figure 17C:
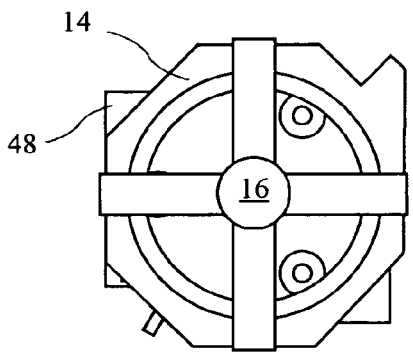
FIG. 17C shows the workpiece table attached to the second table which is attached to the first table with the second table and work piece rotated 180 degrees counter clockwise.

A cross-sectional view of the second table 14 taken along line 16-16 of FIG. 15 is shown with a cooperating roller 72 in FIG. 16. Preferably, three concave rollers 72 (see FIG. 14) cooperate with a convex inner edge 14a of the second table 14 to rotatably position the second table 14 with respect to the first table 12. A bottom surface 14b of the second table 14 includes indentations 78 for cooperation with the detent 70 (see FIG. 14) to index the second table 14 with respect to the first table 12. There are preferably two to six spaced apart indentations 78 on the second table 14, and more preferably four approximately evenly spaced indentations 78. The rotational cooperation between the second table 14 and the first table 12 may include frictional elements instead of the detent and indentations described herein.

Figure 17A:
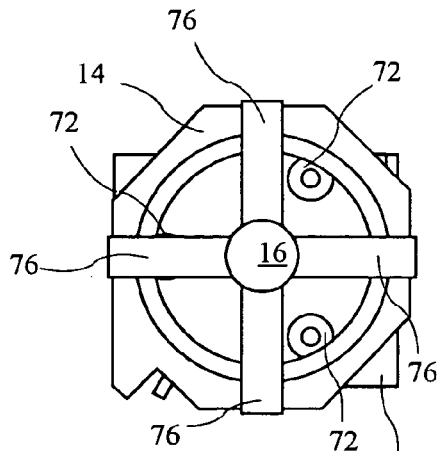
FIG. 17A shows a workpiece table attached to the second table which is attached to the first table.

The workpiece table 16 is shown in FIG. 17A attached to the second table 14 by spindle supports comprising flat springs 76. The flat springs 76 form an "X" above the second table 14 and support the workpiece table 16 while allowing the workpiece table 16 to tilt but not rotate with respect to the second table 14. The flat springs 76 preferably are in the form of an inverted "U". The second table 14 is rotatably held by the rollers 72 (also see FIGS. 14 and 16) which are attached to the upper plate 68 of the first table 12.

The second table 14 is shown rotated 90 degrees counter clockwise with respect to the first table 12 in FIG. 15B, rotated 180 degrees counter clockwise in FIG. 15C, and rotated 270 degrees counter clockwise in FIG. 15D.

Figure 18:
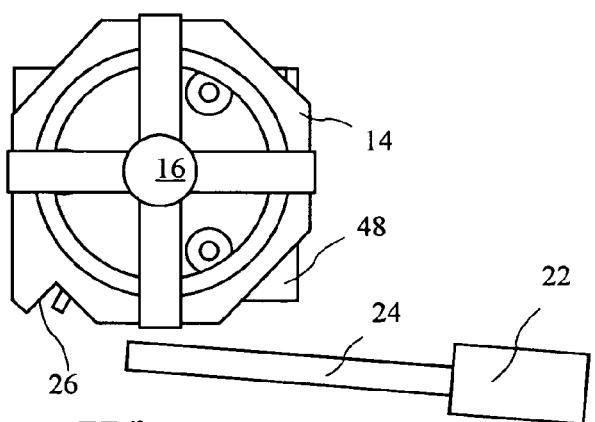
FIG. 18 shows the workpiece table attached to the second table which is attached to the first table and a first actuator and first actuator arm.
Figure 17D:
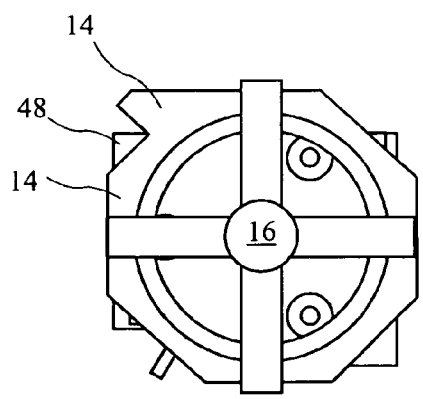
FIG. 17D shows the workpiece table attached to the second table which is attached to the first table with the second table and work piece rotated 270 degrees counter clockwise.

The rotating table assembly 17 is shown with the first actuator 22 and first actuator arm 24 in FIG. 18. While scanning, the first actuator arm is moved (or dropped) out of the way of the actuator notch 26 to allow free rotation of the rotating table assembly 17.

Figure 19A:
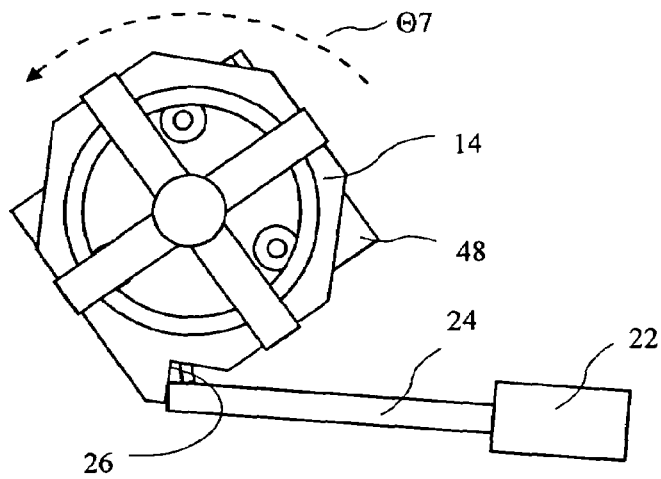
FIG. 19A depicts the second actuator arm positioned to cooperate with an actuator notch on the second table.

The second actuator arm 44 positioned to cooperate with the actuator notch 26 (see FIG. 18) of the second table 14 is shown in FIG. 19A. The rotating table assembly 17 (see FIG. 1A) is rotated by Θ7 with respect to FIG. 18, and the actuator notch 26 has been brought into contact with the first actuator arm 24.

Figure 19B:
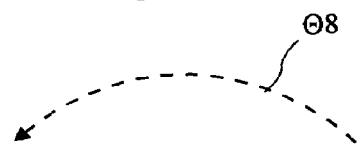
FIG. 19B depicts the cooperation of the second actuator arm with the actuator notch on the second table.

The cooperation of the second actuator arm 24 with the actuator notch 26 resulting in the rotation of the second table 14 with respect to the first table 12 is depicted in FIG. 19B. The first table 12 rotates through an angle Θ8 and the actuator arm 24 blocks the rotation of the second table 14.

Figure 19C:
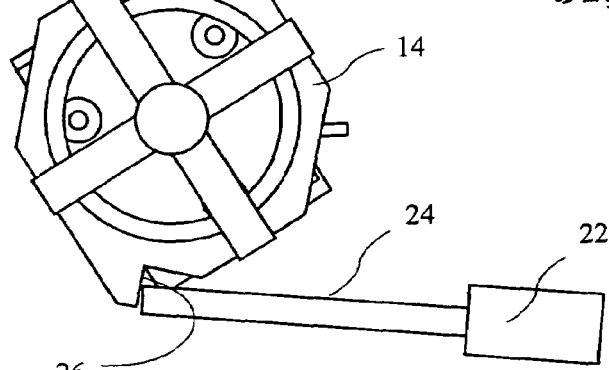
FIG. 19C depicts further cooperation of the second actuator arm with the actuator notch on the second table.

The further cooperation of the first actuator arm 24 with the actuator notch 26 on the second table 14 is shown in FIG. 19C. The first table 12 is rotated by Θ9 to the next indexing point while the second table 14 has been held by the first actuator arm 24.

Figure 20:
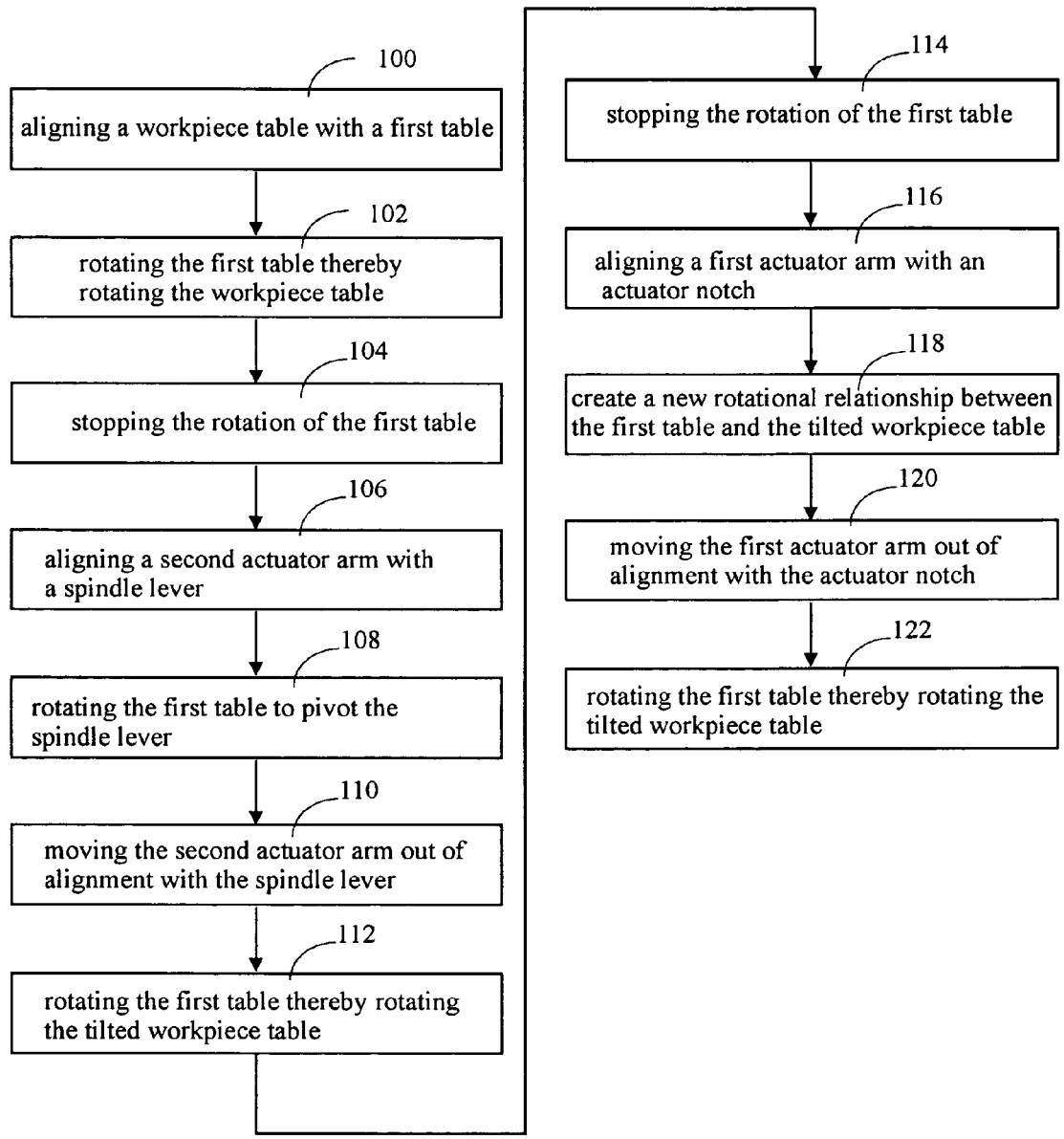
FIG. 20 describes a method according to the present invention.

A method according to the present invention for rotating a workpiece is described in FIG. 20. The method includes aligning a workpiece table supporting a workpiece with a first table at step 100 and rotating the first table thereby rotating the workpiece table to scan a workpiece at step 102. After scanning the vertically aligned workpiece, the rotation of the first table is stopped at step 104, and a second actuator arm is aligned with a spindle lever at step 106. The first table is rotated to pivot the spindle lever at step 108, thereby causing a spindle attached to the workpiece table to tilt and the workpiece table to tilt. After moving the second actuator arm out of alignment with the spindle lever at step 110, the first table is again rotated thereby rotating the tilted workpiece table to obtain a scan of the tilted workpiece at step 112. The method may further include stopping the rotation of the first table at step 114 and aligning a first actuator arm with an actuator notch at step 116. The first table is then rotated at step 118 to create a new rotational relationship between the first table and the tilted workpiece table. The first actuator arm is moved out of alignment with the actuator notch at step 120 and the first table again rotated at step 122 thereby rotating the tilted workpiece table with a different view of the workpiece.

While the invention herein disclosed has been described by means of specific embodiments and applications thereof, numerous modifications and variations could be made thereto by those skilled in the art without departing from the scope of the invention set forth in the claims.

I claim:

1. A robotic turntable comprising:
    a motor;
    a first table rotationally driven by the motor;
    a workpiece table mechanically coupled to the first table
        wherein the workpiece table is rotatable with the first table to maintain a rotational position of the workpiece table with respect to the first table and the workpiece table is rotatable with respect to the first table to change the rotational position of the workpiece table with respect to the first table and the workpiece table is tiltable to a first tilt and to a second tilt with respect to the first table;

a first actuator having a first actuating member moveable between a free position and a stop position, wherein while the first actuating member is in the free position the first actuating member does not affect rotation of the workpiece table thereby allowing the workpiece table to rotate with the first table and while the first actuating member is in the stop position the first actuating member prevents the workpiece table from rotating with respect to the first table thereby changing the rotational position of the workpiece table with respect to the first table; and a second actuator having a second actuating member moveable between a second free position and a second stop position, wherein while the second actuating member is in the second free position the second actuating member does not contact rotatable elements of the robotic turntable, and while the second actuating member is in the second stop position, the rotation of the first table is coupled to a change in tilt of the workpiece table.

2. The robotic turntable of claim 1, further including a second table coaxial with the first table, wherein
the second table is rotationally positionable relative to the first table;
if the first actuator is in the free position, the second table rotates with the first table;
if the first actuator is in the stop position, the rotation of the first table is coupled to a change in the rotational position of the second table with the first table; and
if the second actuator is in the stop position, the rotation of the first table is coupled to a change in tilt of the work piece table with respect to the second table.

3. The robotic turntable of claim 2, wherein the workpiece table is rotationally fixed with respect to the second table.

4. The robotic turntable of claim 3, wherein the workpiece table is connected to the second table at the intersection of leaf springs whereby the workpiece table is rotationally fixed to the second table and is tiltable with respect to the second table.

5. The robotic turntable of claim 4, wherein the workpiece table is connected to the second table at the intersection of two leaf springs forming an "X" above the second table, wherein opposite ends of the each of the two leaf springs are attached to the second table.

6. The robotic turntable of claim 2, wherein if the first actuator is in the stop position, a first actuator arm blocks the rotation of the second table, thereby changing the rotational position of the second table relative to the first table.

7. The robotic turntable of claim 2, wherein:
the second table is rotatably mounted to the first table and includes indentations facing the first table;
the first table includes a detent positioned to cooperate with the indentations in the second table; and
the cooperation of the detent with the indentations provides rotational indexing of the second table to the first table.

8. The robotic turntable of claim 1, further including a spindle orthogonally attached to the workpiece table, wherein
the spindle includes a movable end opposite the workpiece table; and
moving the moveable end tilts the workpiece table.

9. The robotic turntable of claim 8, further including a spindle lever pivotally attached to the first table, wherein:

the moveable end of the spindle is a lever end; and
the lever end intersects the spindle lever, wherein pivoting the spindle lever causes the spindle to tilt.

10. The robotic turntable of claim 9, wherein if the second actuator is in the second stop position, a second arm of the second actuator intercepts the spindle lever and couples the rotation of the first table to a change in tilt of the workpiece table.

11. The robotic turntable of claim 9, further including a spindle guide attached to the first table and having a spindle slot, wherein:
the spindle lever includes a lever slot;
the spindle slot is skewed relative to the lever slot, wherein the lever slot and the spindle slot cooperate to guide a trajectory of the lever end of the spindle.

12. The robotic turntable of claim 8, further including a second table coaxial with the first table, wherein
the second table is rotationally positionable relative to the first table;
the workpiece table is connected to the second table at the intersection of two leaf springs forming an "X" above the second table, wherein opposite ends of the each of the two leaf springs are attached to the second table;
if the first actuator is in the free position, the second table rotates with the first table;
if the first actuator is in the stop position, the rotation of the first table is coupled to a change in the rotational position of the second table with the first table; and
if the second actuator is in the stop position, the rotation of the first table is coupled to a change in tilt of the work piece table with respect to the second table.

13. A robotic turntable comprising:
a first rotating table;
a second rotating table;
a workpiece table; and
a motor for rotating the first rotating table,
wherein:
the second rotating table is coaxial with the first rotating table and rotationally positionable relative to the first rotating table;
the workpiece table is rotationally fixed with respect to the second rotating table and is tiltably positionable with respect to the second rotating table;
a first actuator includes a first actuating member moveable to a stop position wherein the first actuating member cooperates with the second rotating table to prevent the rotation of the second rotating table to change the rotational position of the second rotating table with respect to the first rotating table;
a second actuator includes a second actuating member moveable to a second stop position wherein the second actuating member cooperates with a lever attached to the first rotating table and combined with rotation of the first rotating table pivots the lever with respect to the first rotating table causing a change the tilt of the workpiece table; and
changes to rotation and tilt are obtained solely by the positions of the actuators and rotation of the first rotating table by the motor.

14. The robotic turntable of claim 13, wherein the cooperation of the first actuator with the second rotating table comprises the first actuator moving a first actuator arm to a stop position wherein rotation of the second rotating table is blocked by the first actuator arm.

15. The robotic turntable of claim 13, further including a spindle orthogonally attached to the workpiece table and having a lever end opposite the workpiece table, wherein the cooperation of the second actuator with the spindle lever comprises the second actuator moving a second actuator arm to intersect the spindle lever, wherein rotation of the first rotating table causes the spindle lever to pivot and to move the lever end of the spindle thereby causing the workpiece table to tilt.

16. The robotic turntable of claim 13, wherein the workpiece table is connected to the second rotating table at the intersection of two leaf springs forming an "X" above the second table, wherein opposite ends of the each of the two leaf springs are attached to the second rotating table whereby the workpiece table is rotationally fixed to the second rotating table and is tiltable with respect to the second rotating table.

17. The robotic turntable of claim 13, wherein:
    the second rotating table is rotatably mounted to the first rotating table and includes indentations facing the first rotating table;
    the first rotating table includes a detent positioned to cooperate with the indentations in the second rotating table; and
    the cooperation of the detent with the indentations provides rotational indexing of the second rotating table to the first rotating table.

18. The robotic turntable of claim 13, further including a spindle orthogonally attached to the workpiece table, wherein the spindle includes a lever end opposite the workpiece table and moving the lever end tilts the workpiece table, wherein:
    the lever is a spindle lever pivotally attached to the first table; and
    lever end intersects the spindle lever, wherein pivoting the spindle lever causes the workpiece table to tilt.

19. A method for controlling a workpiece table, the method comprising:
    aligning a vertical axis of a workpiece table at a first tilt with respect to a first table, the workpiece table rotatably coupled to the first table, the first table rotationally carried by a base;
    rotating the first table using a servo motor attached to the base thereby also rotating the workpiece table at the first tilt;
    stopping the rotation of the first table;
    aligning a second non-rotating actuator arm attached to the base with a tilt lever, the tilt lever mechanically coupled to the first table and rotating with the first table and having a first position causing the workpiece table to assume the first tilt and a second position causing the workpiece table to assume a second tilt with respect to the first table
    rotating the first table to cause the second actuator arm to engage the tilt lever to pivot the tilt lever from the first position to the second position, thereby causing the workpiece table to move from the first tilt angle to the second tilt angle;
    moving the second actuator arm out of alignment with the tilt lever; and
    rotating the first table thereby rotating the tilted workpiece table at the second tilt angle.

20. The method of claim 19, further including:
    stopping the rotation of the first table;
    aligning a first non-rotating actuator arm attached to the base with an actuator notch in a non-tilting second table, the second table rotatably coupled to the first table and the workpiece table non-rotatably coupled to the second table and tiltable at the first tilt and at the second tilt with respect to the second table
    rotating the first table to cause the first actuator arm to engage the actuator notch in the second table to hold the second table rotationally fixed while the first table rotates to create a new rotational relationship between the first table and the workpiece table;
    moving the first actuator arm out of alignment with the actuator notch; and
    rotating the first table thereby rotating the tilted workpiece table at a new rotational alignment between the first table and the workpiece table.

* * * * *